US012064780B2

(12) United States Patent
Takata et al.

(10) Patent No.: US 12,064,780 B2
(45) Date of Patent: Aug. 20, 2024

(54) LIQUID OBJECT DISPENSER

(71) Applicant: SHISEIDO COMPANY, LTD., Tokyo (JP)

(72) Inventors: Motoki Takata, Tokyo (JP); Motoji Aoki, Tokyo (JP); Yohei Kobayashi, Tokyo (JP); Yusuke Okamoto, Fukuoka (JP); Takenori Okamura, Fukuoka (JP); Kazunari Anai, Fukuoka (JP)

(73) Assignee: SHISEIDO COMPANY, LTD., Tokyo (JP)

( * ) Notice: Subject to any disclaimer, the term of this patent is extended or adjusted under 35 U.S.C. 154(b) by 329 days.

(21) Appl. No.: 17/594,392

(22) PCT Filed: Apr. 26, 2019

(86) PCT No.: PCT/JP2019/018136
§ 371 (c)(1),
(2) Date: Oct. 14, 2021

(87) PCT Pub. No.: WO2020/217526
PCT Pub. Date: Oct. 29, 2020

(65) Prior Publication Data

US 2022/0143641 A1 May 12, 2022

(51) Int. Cl.
*B05B 12/14* (2006.01)
*B05C 11/10* (2006.01)

(52) U.S. Cl.
CPC ...... *B05B 12/1418* (2013.01); *B05C 11/1036* (2013.01)

(58) Field of Classification Search
CPC ............. B05B 12/1418; B05B 11/1052; B05B 11/1084; B05B 12/1409; B05B 11/0054;
(Continued)

(56) References Cited

U.S. PATENT DOCUMENTS 912,106 A * 2/1909 Frazier .................. B05B 7/2472 239/428
3,084,871 A * 4/1963 Puglis .................... B65D 83/68 239/557
(Continued)

FOREIGN PATENT DOCUMENTS

CN 107983558 5/2018
JP 2002-261138 9/2002
(Continued)

OTHER PUBLICATIONS

Extended European Search Report issued in the counterpart European Patent Application No. 19925640.5, mailed Oct. 7, 2022.
(Continued)

*Primary Examiner* — Donnell A Long
(74) *Attorney, Agent, or Firm* — IPUSA, PLLC

(57) ABSTRACT

A liquid object dispenser includes a body, multiple containers (500), a transfer table (110) including multiple container accommodating parts accommodating the multiple containers, the transfer table being able to relatively transfer the container accommodating parts to a replacement position in the body at which the containers are replaced and to a dispensing position in the body at which the stored liquids of the containers accommodated in the container accommodating parts are dispensed, and a liquid object dispensing part configured to cause the stored liquids of the containers accommodated in the container accommodating parts at the dispensing position to be dispensed.

8 Claims, 9 Drawing Sheets

(58) Field of Classification Search
CPC . B05B 12/122; B05C 11/1036; A45D 44/005; A45D 2034/005; A45D 34/00; A47K 5/12
See application file for complete search history.

(56) References Cited

U.S. PATENT DOCUMENTS

| | | | | |
|---|---|---|---|---|
| 3,851,655 A * | 12/1974 | Tarro | A45D 44/005 132/294 |
| 6,510,366 B1 * | 1/2003 | Murray | A45D 44/005 700/285 |
| 2003/0062379 A1 * | 4/2003 | Bartholomew | G07F 13/06 435/100 |
| 2014/0319238 A1 | 10/2014 | Su | |
| 2015/0034208 A1 | 2/2015 | Chang et al. | |
| 2018/0085721 A1 * | 3/2018 | Rinaldis | B01F 35/2207 |
| 2018/0125207 A1 * | 5/2018 | Shami | G01N 21/255 |
| 2018/0206612 A1 * | 7/2018 | Bartholomew | A45D 44/005 |
| 2018/0368558 A1 * | 12/2018 | Park | A45D 44/005 |
| 2020/0405039 A1 * | 12/2020 | Jung | A45D 44/00 |
| 2021/0307485 A1 * | 10/2021 | Nasu | A45D 34/04 |
| 2021/0401151 A1 * | 12/2021 | Dinh | A45D 40/26 |

FOREIGN PATENT DOCUMENTS

| | | |
|---|---|---|
| JP | 2003-093931 | 4/2003 |
| JP | 2007-105648 | 4/2007 |
| JP | 2007-307749 | 11/2007 |
| JP | 2012-144283 | 8/2012 |
| JP | 2016-019934 | 2/2016 |
| JP | 2016-020224 | 2/2016 |
| WO | 2016/029104 | 2/2016 |

OTHER PUBLICATIONS

International Search Report for PCT/JP2019/018136 mailed on Jul. 9, 2019.

Office Action issued in the counterpart Chinese Patent Application No. 201980095728.8 mailed Sep. 27, 2022.

Office Action issued in the counterpart European Patent Application No. 19925640.5 mailed Jul. 19, 2023.

* cited by examiner

LIQUID OBJECT DISPENSER

TECHNICAL FIELD

The present invention relates to liquid object dispensers.

BACKGROUND ART

A dispenser that automatically dispenses and supplies a cosmetic or the like stored in a storage tank has been known (Patent Document 1).

PRIOR ART DOCUMENT

Patent Document

Patent Document 1: International Publication No. 2016/029104

SUMMARY OF THE INVENTION

Problems to be Solved by the Invention

According to the conventional art, however, it is necessary to prepare a mechanism for dispensing a liquid object according to the number of storage tanks. Furthermore, liquid objects are dispensed from the storage tanks onto different places, thus increasing an area in which the liquid objects are dispensed.

An embodiment of the present invention has an object of providing a liquid object dispenser that dispenses the liquid objects of multiple containers onto the same place.

Means for Solving the Problems

A liquid object dispenser according to the disclosure includes a body, multiple containers, a transfer table including multiple container accommodating parts accommodating the multiple containers, the transfer table being able to relatively transfer the container accommodating parts to a replacement position in the body at which the containers are replaced and to a dispensing position in the body at which the stored liquids of the containers accommodated in the container accommodating parts are dispensed, and a liquid object dispensing part configured to cause the stored liquids of the containers accommodated in the container accommodating parts at the dispensing position to be dispensed.

Effects of the Invention

It is possible to dispense the liquid objects of multiple containers onto the same place.

EMBODIMENT OF THE INVENTION

An embodiment of the present invention is described in detail below using the accompanying drawings.

<Liquid Object Dispensing System 1>

Figure 1:
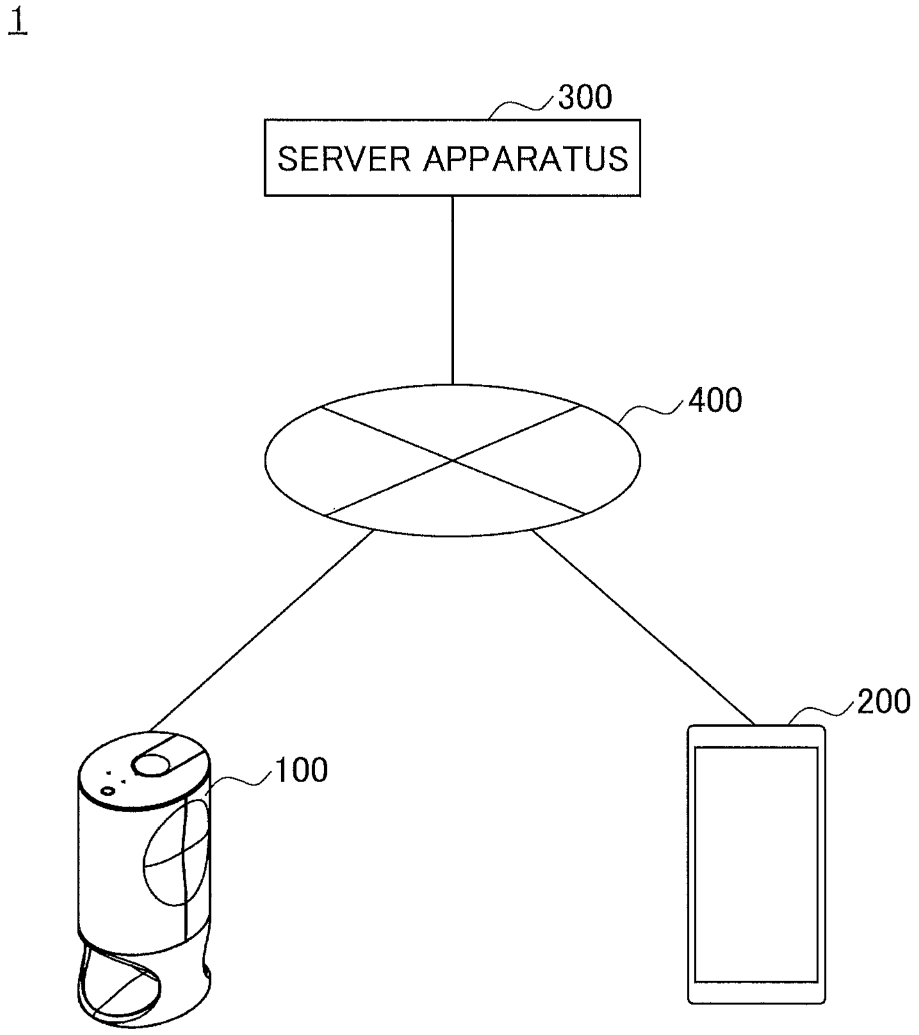
FIG. 1 is an overall configuration diagram of an example of a liquid object dispensing system according to this embodiment.

FIG. 1 is an overall configuration diagram of an example of a liquid object dispensing system 1 according to this embodiment.

The liquid object dispensing system 1 according to this embodiment includes a liquid object dispenser 100, an information processing terminal 200, and a server apparatus 300. The liquid object dispenser 100, the information processing terminal 200, and the server apparatus 300 are connected via a network 400. The liquid object dispenser 100 will be described later. The information processing terminal 200 is, for example, a portable terminal such as a smartphone or a tablet computer. The information processing terminal 200 transmits user information, etc., to the server apparatus 300. The server apparatus 300 is an information processor (computer) that executes processes as a server. The server apparatus 300 manages a user of the liquid object dispenser 100 and the state of the liquid object dispenser 100. Furthermore, the server apparatus 300 determines the manner in which the liquid object dispenser 100 is caused to operate, based on user information, etc., transmitted from the information processing terminal 200 and weather information, etc., open to the public.

According to the liquid object dispensing system 1 of this embodiment, the liquid object dispenser 100 receives information on the operation of the liquid object dispenser 100 (operation information) from the server apparatus 300 via the network 400. The liquid object dispenser 100 executes processes based on the received operation information. Furthermore, the liquid object dispenser 100 transmits the results of the processes executed based on the received operation information to the server apparatus 300. The server apparatus 300 updates information on the state of the liquid object dispenser 100, etc.

According to FIG. 1, the liquid object dispenser 100, the information processing terminal 200, and the server apparatus 300, one each, are connected to the network 400, but their respective numbers are not limited to those of FIG. 1. For example, multiple liquid object dispensers 100 and multiple information processing terminals 200 may be connected to the single server apparatus 300. Furthermore, the processes of the server apparatus 300 may be distributed between or among and executed by multiple server apparatuses 300. Moreover, the liquid object dispenser 100 may be caused to operate independently without being connected to the network 400.

<Liquid Object Dispenser 100>

Next, the liquid object dispenser 100 is described.

Figure 2:
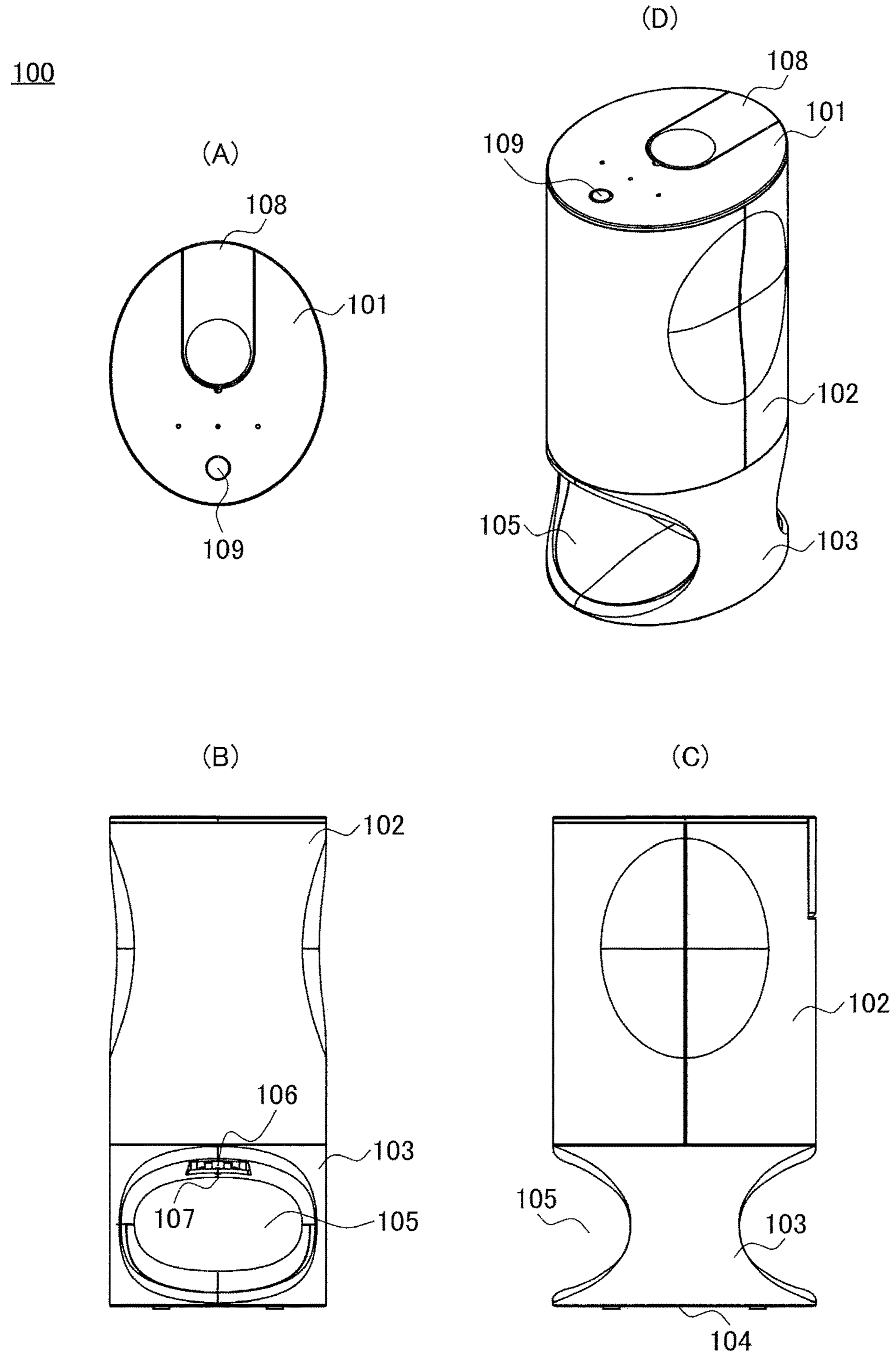
FIG. 2 is an overall view of an example of a liquid object dispenser according to this embodiment.

FIG. 2 is an overall view of an example of the liquid object dispenser 100 according to this embodiment. FIG. 2(A) is a top view (plan view) of the liquid object dispenser 100. FIG. 2(B) is a front view of the liquid object dispenser 100. FIG. 2(C) is a side view of the liquid object dispenser 100. FIG. 2(D) is a perspective view of the liquid object dispenser 100.

The liquid object dispenser 100 includes an upper surface part 101, an upper housing 102, a lower housing 103, and a bottom surface part 104. The liquid object dispenser 100 has a substantially cylindrical shape. The lower housing 103 includes a hand insertion part 105. Furthermore, the lower housing 103 includes an extraction opening 106 and a human body sensor 107 above the hand insertion part 105. A user inserts a hand into the hand insertion part 105, and the human body sensor 107 detects the hand. In response to detection of the hand by the human body sensor 107, a stored liquid (liquid object) stored in a below-described container 500 is dispensed from the extraction opening 106. The liquid object dispenser 100 includes a container lid 108. The container lid 108 is provided over the upper surface part 101 and the upper housing 102. The user opens the container lid 108 to replace the below-described container 500 that is exposed through an opening exposed by the opened container lid 108. Furthermore, the liquid object dispenser 100 includes a button (switch) 109 in the upper surface part 101. Once the user presses the button 109, the liquid object dispenser 100 starts to operate.

The upper housing 102 and the lower housing 103 are an example of a body.

<Container 500>

Next, the container 500 is described.

Figure 3:
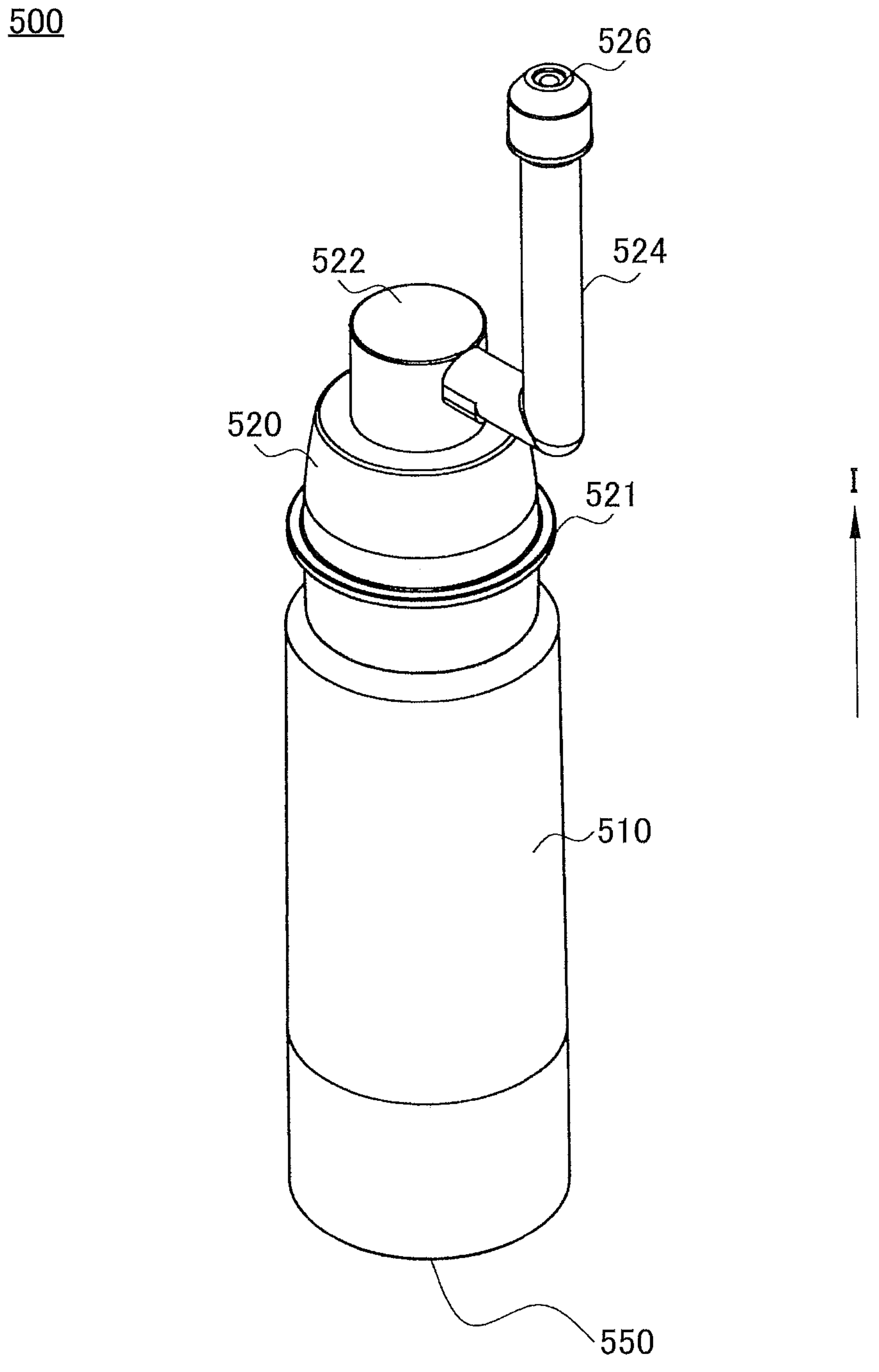
FIG. 3 is a perspective view of a container of an example of the liquid object dispenser according to this embodiment.

FIG. 3 is a perspective view of the container 500 of an example of the liquid object dispenser 100 according to this embodiment.

The container 500 is, for example, a container that stores a liquid object (stored liquid) such as a cosmetic such as an emulsion or a serum. With respect to emulsions, for example, multiple types of emulsions may be used for morning and for night. With respect to serums, for example, multiple types of serums for anti-oxidation, drying prevention, stress reduction, etc., may be used.

The container 500 according to this embodiment includes a body 510 and a lid 520. A stored liquid (liquid object) is stored in the body 510. The lid 520 is attached to the body 510 by screwing or the like. The lid 520 includes a flange 521, a push button (pressing member) 522, and a pipe 524. A dispensing opening 526 from which the stored liquid (liquid object) is dispensed is provided at an end of the pipe 524 opposite to the push button 522. The liquid object (stored liquid) in the container 500 is dispensed in response to the pressing of the push button 522.

The container 500 includes an RFID tag 550 at the bottom surface part of the body 510. The RFID tag 550 stores a unique identifier attached to each container 500, information on the product type of the liquid object (stored liquid) stored in the container 500, and the expiration date, the remaining amount, etc., of the liquid object. Because the container 500 includes the RFID tag 550, it is possible to manage the use-by date and the amount of use of the liquid object (stored liquid) stored in the container 500, prevent wrong insertion of the container 500, prevent distribution of counterfeit products, and ensure the traceability of the container 500 and the liquid object (stored liquid) stored in the container 500.

While the container 500 of this embodiment uses the RFID tag 550, means for recording information on the container 500 is not limited to RFID tags. For example, a barcode, etc., may also be used.

The container 500 of this embodiment is accommodated in a below-described container accommodating part 120 of a turntable 110 of the liquid object dispenser 100 in such a manner that the push button 522 faces downward. Specifically, the container 500 is inserted into the container accommodating part 120 in the direction of arrow I to be accommodated in the container accommodating part 120.

<Turntable 110>

Figure 4:
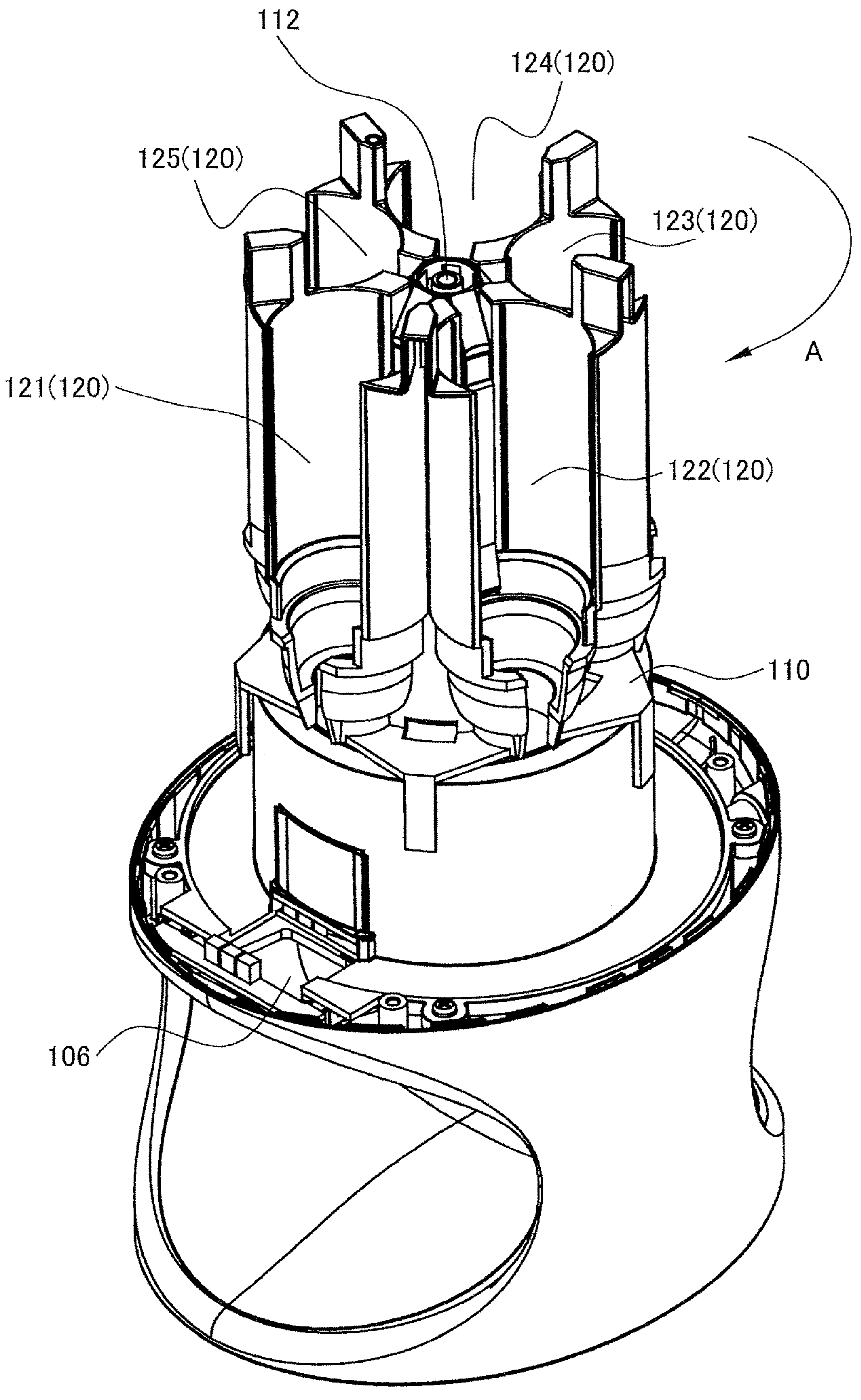
FIG. 4 is a perspective view of an example of the liquid object dispenser according to this embodiment, illustrating its internal structure.
Figure 5:
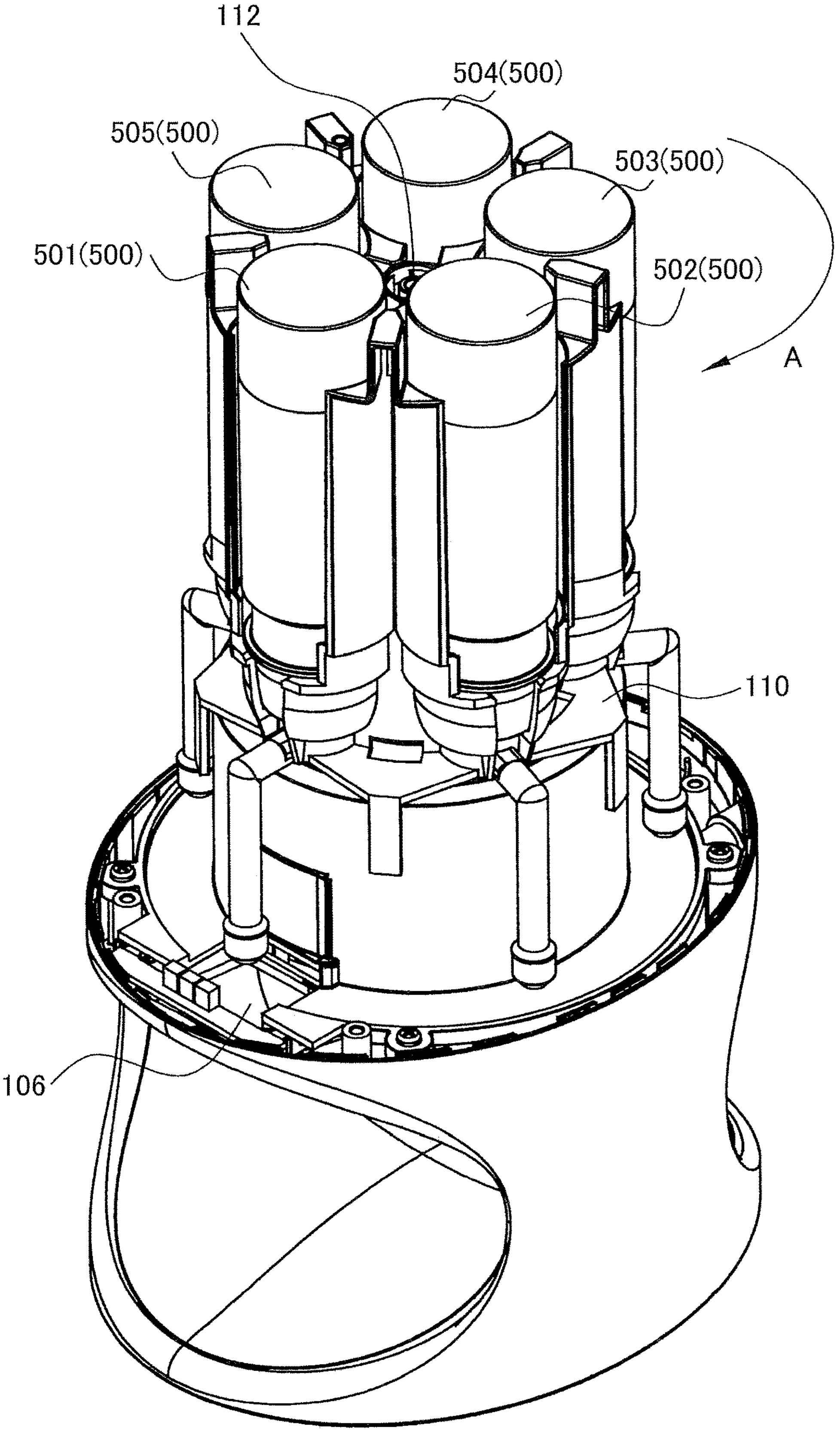
FIG. 5 is a perspective view of an example of the liquid object dispenser according to this embodiment, illustrating its internal structure.

FIGS. 4 and 5 are perspective views of an example of the liquid object dispenser 100 according to this embodiment, illustrating its internal structure. FIGS. 4 and 5 are diagrams illustrating a state where the upper housing 102 and part of the inside of the upper housing 102 are removed to expose the turntable 110. FIG. 4 is a diagram illustrating a state where the containers 500 are not accommodated in the container accommodating parts 120. FIG. 5 is a diagram illustrating a state where the containers 500 are accommodated in the container accommodating parts 120.

The liquid object dispenser 100 according to this embodiment includes the turntable 110 in the upper housing 102 and on top of the lower housing 103. The turntable 110 rotates on a rotary shaft 112 in the direction of arrow A or in a direction opposite to arrow A relative to the upper housing 102 and the lower housing 103. While the turntable 110 is used to rotationally transfer the containers 500 according to the liquid object dispenser 100 of this embodiment, the transfer method is not limited to rotation. For example, a transfer table that horizontally transfers the container accommodating parts 120 on a straight line may also be used. Thus, the turntable 110 is movable relative to the upper housing 102 and the lower housing 103.

The turntable 110 is an example of a transfer table.

The turntable 110 includes the container accommodating parts 120 that accommodate the containers 500. The container accommodating parts 120 are disposed at regular intervals in the circumferential direction of a circle having a center at the rotary shaft 112. The turntable 110 of this embodiment includes the container accommodating parts 120 at five places in total. The container accommodating parts 120 are designated as container accommodating parts 121, 122, 123, 124 and 125. The container accommodating part 121 accommodates a container 501. Likewise, the container accommodating parts 122, 123, 124 and 125 accommodate containers 502, 503, 504 and 505, respectively. While each container accommodating part 120 accommodates a specific container 500 according to the above description, each container accommodating part 120 may accommodate any container 500. Furthermore, the containers 500 are accommodated in the container accommodating parts 120 in such a manner that the pipes 524 are on the outer side of the container accommodating parts 120 relative to the rotary shaft 112 of the turntable 110.

The container accommodating parts 120 of the turntable 110 include a fixation structure (whose graphical representation is omitted) that fixes the containers 500. The containers 500 are fixed by the fixation structure so as not to move in the vertically upward direction of FIG. 5 when accommodated in the container accommodating parts 120.

Each container 500 revolves relative to the upper housing 102 and the lower housing 103 as the turntable 110 rotates.

Figure 6:
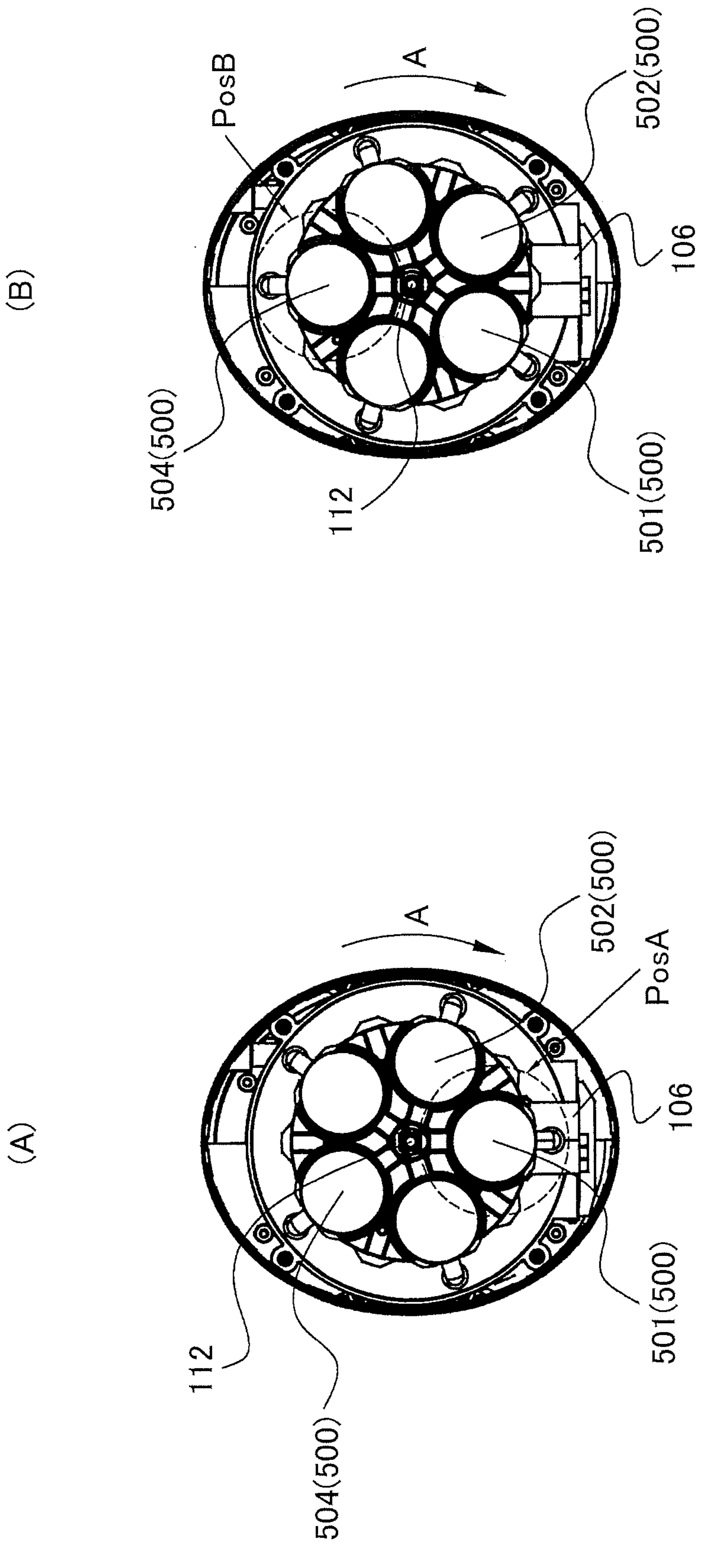
FIG. 6 illustrates top views of an example of the liquid object dispenser according to this embodiment, illustrating its internal structure.

FIG. 6 illustrates top views of an example of the liquid object dispenser 100 according to this embodiment, illustrating its internal structure. FIG. 6 illustrates views of the turntable 110 in which the containers 500 are accommodated in the container accommodating parts 120 as seen from above. FIG. 6(A) illustrates a state where the container 500 (the container 501) is positioned over the extraction opening 106. FIG. 6(A) is a view of the liquid object dispenser 100 of FIG. 5 as seen from above. The position of the container 501 over the extraction opening 106 is referred to as dispensing position PosA. According to the liquid object dispenser 100 of this embodiment, the five containers 500 in total may be accommodated in the container accommodating parts 120. Therefore, as the turntable 110 rotates 72° on the rotary shaft 112, the containers 501, 502, 503, 504 and 505 sequentially arrive at the dispensing position PosA.

FIG. 6(B) depicts a state where the turntable 110 has rotated 36 degrees in the direction of arrow A from the state illustrated in FIG. 6(A). FIG. 6(B) depicts a state where the middle part between the container 501 and the container 502 is positioned over the extraction opening 106. The position opposite to the dispensing position PosA relative to the rotary shaft 112 (the position of the container 504 in FIG. 6(B)) is referred to as replacement position PosB. In FIG. 6(B), as the turntable 110 illustrated in FIG. 6(A) rotates 36°, the container 504 (500) also rotates 36° to be positioned at PosB. When the container lid 108 is opened, the container 500 at the replacement position PosB is exposed to the outside. The user can replace the container 500 at the replacement position PosB with another container 500.

Thus, according to the liquid object dispenser 100 of this embodiment, the turntable 110 is configured to rotate 36° by 36° on the rotary shaft 112. As a result, the containers 501 through 505 can sequentially be positioned at the dispensing position PosA or the replacement position PosB.

According to the liquid object dispenser 100 of this embodiment, as illustrated in FIG. 6, the dispensing position PosA and the replacement position PosB are at different positions in a plan view (a top view).

<Dispensing Mechanism 130>

Figure 7:
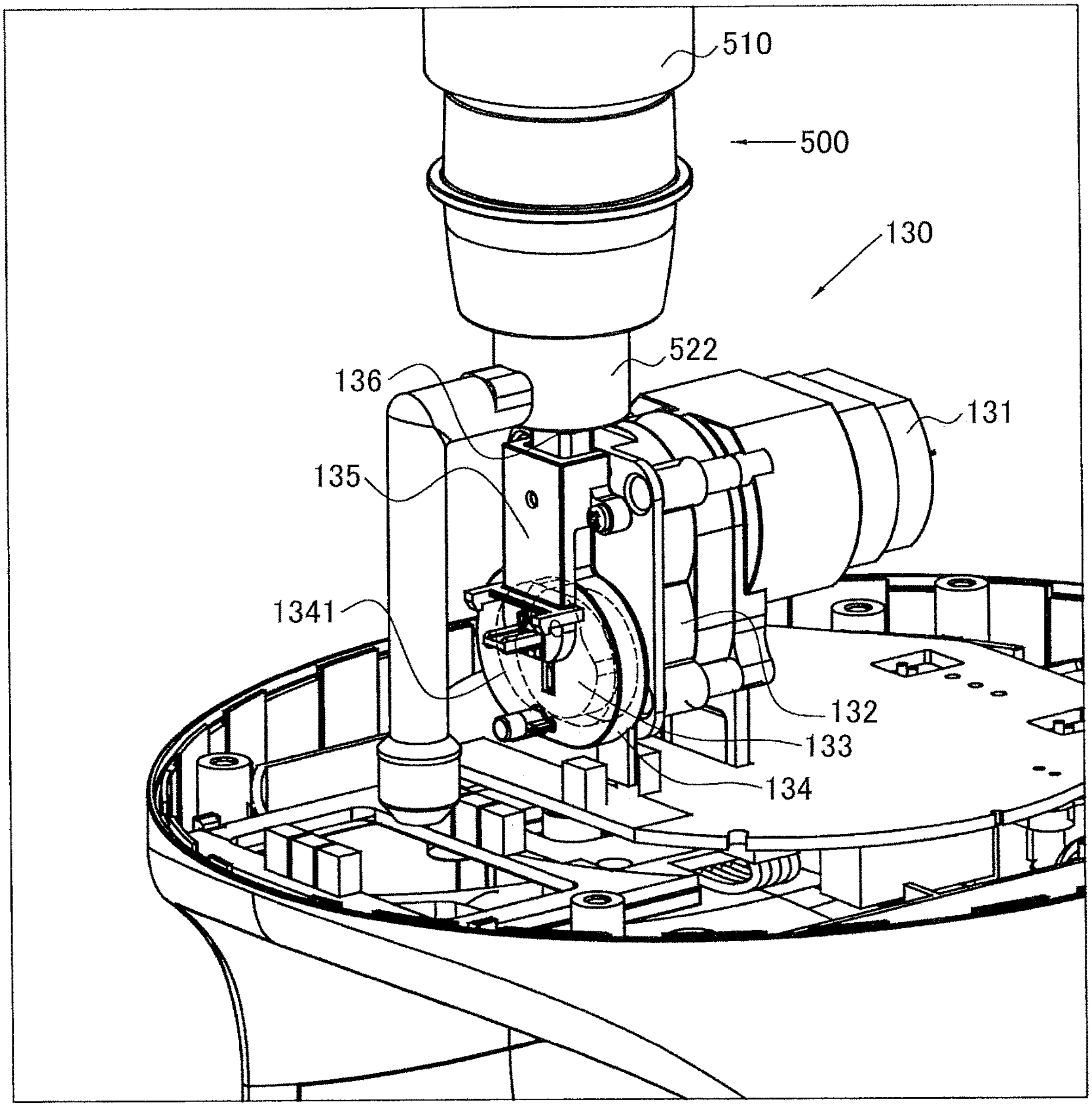
FIG. 7 is a perspective view of an example of the liquid object dispenser according to this embodiment, illustrating the details of a dispensing mechanism.

FIG. 7 is a perspective view of an example of the liquid object dispenser 100 according to this embodiment, illustrating the details of its dispensing mechanism 130.

The liquid object dispenser 100 includes the dispensing mechanism 130 at a position corresponding to the dispensing position PosA on the turntable 110. The dispensing mechanism 130 according to this embodiment includes a dispensing motor 131, a speed reducer 132, a cam 133, a slide member 134, and a fixing member 135. The rotating shaft of the dispensing motor 131 connects to the speed reducer 132. The speed reducer 132 connects to the cam 133. The speed reducer 132 decelerates the rotation of the dispensing motor 131 to turn the cam 133. The cam 133 is a substantially fan-shaped eccentric cam. The cam 133 is inserted in a recess 1341 provided in a surface of the slide member 134 facing toward the speed reducer 132. The cam 133 turns to contact the inner surface of the recess 1341 to slide the slide member 134 up and down. The fixing member 135 is a member that fixes the slide member 134 while holding the slide member 134 in such a manner as to slide the slide member 134 up and down.

The turntable 110 transfers the container 500 to the dispensing position PosA. The position of the push button 522 of the container 500 at the dispensing position PosA coincides with the position of an end portion 136 of the slide member 134 in a top view. When the slide member 134 slides toward the container 500 (upward), the end portion 136 of the slide member 134 contacts the push button 522 of the container 500 to press the push button 522 of the container 500 toward the body 510 of the container 500. The body 510 and the lid 520 of the container 500 are immovably fixed by a fixing structure that is not depicted. Accordingly, as the push button 522 of the container 500 is pressed, the stored liquid (dispensing liquid) stored in the container 500 is dispensed. The liquid object dispenser 100 controls the amount of the stored liquid (dispensing liquid) by the number of times the push button 522 is pressed.

The dispensing mechanism 130 is an example of a liquid object dispensing part.

<Control Device 140>

Figure 8:
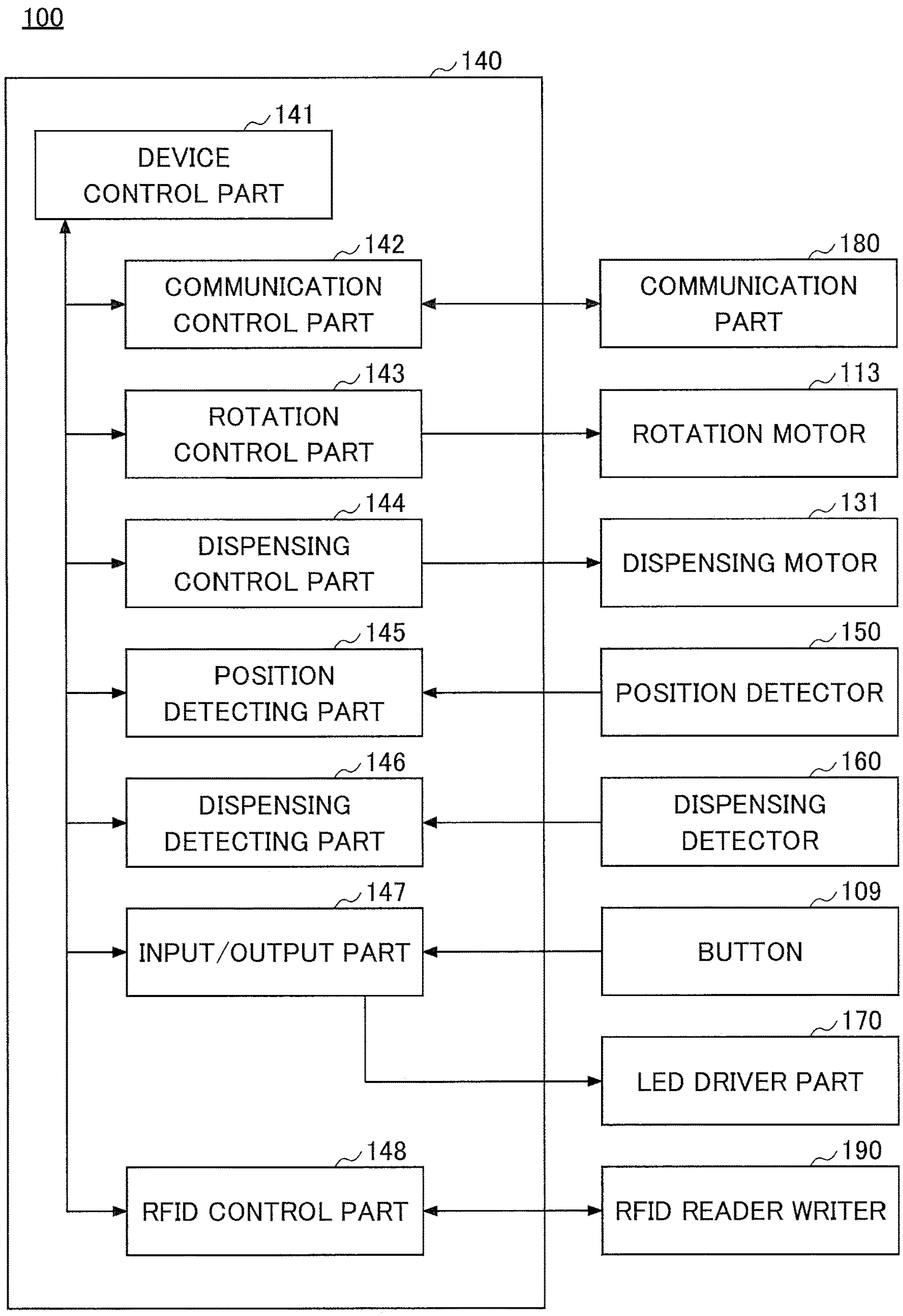
FIG. 8 is a functional block diagram of an example of the liquid object dispenser according to this embodiment.

FIG. 8 is a functional block diagram of an example of the liquid object dispenser 100 according to this embodiment.

The liquid object dispenser 100 includes the control device 140. The control device 140 controls the operation of the liquid object dispenser 100. The control device 140 includes a device control part 141, a communication control part 142, a rotation control part 143, a dispensing control part 144, a position detecting part 145, a dispensing detecting part 146, an input/output part 147, and an RFID control part 148.

The device control part 141 controls the entire device.

The communication control part 142 controls communications between the liquid object dispenser 100 and the information processing terminal 200 and the server apparatus 300. The communication control part 142 controls a communication part 180 provided in the liquid object dispenser 100. The communication part 180 performs communications with the information processing terminal 200 and the server apparatus 300 via the network 400 based on the control of the communication control part 142. The communication part 180 performs communications through, for example, short-range communications based on Bluetooth (registered trademark) or the like, wireless LAN (Local Area Network) communications, mobile communications based on LTE (Long Term Evolution) or the like, etc.

The rotation control part 143 controls the rotation of the turntable 110. The turntable 110 is connected to a rotation motor 113. The rotation control part 143 controls the rotation of the turntable 110 by controlling the rotation of the rotation motor 113.

The rotation motor 113 is an example of a drive part, and the rotation control part 143 is an example of a control part.

The dispensing control part 144 controls the dispensing of the liquid object (stored liquid). The dispensing control part 144 controls the dispensing of the liquid object (stored liquid) by controlling the rotation of the dispensing motor 131 of the dispensing mechanism 130.

The position detecting part 145 detects whether a predetermined container 500 is at a predetermined position, for example, the dispensing position PosA or the replacement position PosB. The position detecting part 145 detects the position of a predetermined container 500 from the detection result of a position detector 150 provided in the liquid object dispenser 100.

The dispensing detecting part 146 detects whether the liquid object (stored liquid) has been dispensed from the container 500 at the dispensing position PosA. The dispensing detecting part 146 detects whether the liquid object (stored liquid) has been dispensed from the detection result of a dispensing detector 160 provided in the liquid object dispenser 100.

The input/output part 147 receives an input from the user and outputs information to the user. The input/output part 147 detects the depression of the button 109 to receive an input from the user. Furthermore, the input/output part 147 controls the light emission of an LED provided in the liquid object dispenser 100 by controlling an LED driver part 170 to output information to the user.

The RFID control part 148 controls the input and output of information recorded in the RFID tag 550 of the container 500. The RFID control part 148 controls an RFID reader writer 190 provided in the liquid object dispenser 100 to read information from and write information to the RFID tag 550 of the container 500.

The functions of the control device 140 are implemented by a CPU (Central Processing Unit) running programs readably stored in a storage that is not depicted. For example, these functions are implemented by the cooperation of hardware and software in a microcomputer including a CPU. The control device 140 may be distributed between or among multiple processors, or other functions may be incorporated into the control device 140.

<Operation of Liquid Object Dispenser 100>

The server apparatus 300 determines the type and amount of a liquid object dispensed from the liquid object dispenser 100 used by a user from personal information such as the age, skin characteristics, skin condition, etc., of the user, the environmental information such as temperature, humidity, and weather of the day of use, time information, etc. When the user depresses the button (switch) 109 of the liquid object dispenser 100, the liquid object dispenser 100 performs transmission to the server apparatus 300, and the server apparatus 300 transmits information on the type and amount of a liquid object to be dispensed (dispensing liquid information) to the liquid object dispenser 100. When the user inserts her/his hand into the hand insertion part 105, the liquid object dispenser 100 dispenses one or more types of liquid objects corresponding to the containers 500 housed in the liquid object dispenser 100. The liquid object dispenser 100 dispenses each liquid object based on the amount in the dispensing liquid information.

The device control part 141 of the liquid object dispenser 100 identifies the container 500 from which to dispense a liquid object among the containers 500 (501, 502, 503, 504, 505) accommodated in the liquid object dispenser 100, from the dispensing liquid information received from the server apparatus 300. The device control part 141 calculates the amount of the liquid object to dispense, namely, the number of times the push button 522 is pressed, with respect to the identified dispensing container 500.

In response to the insertion of the user's hand into the hand insertion part 105, the device control part 141 rotationally transfers the container accommodating part 120 of the container 500 from which to dispense the liquid object to the dispensing position PosA by controlling the rotation control part 143. Next, the device control part 141 controls the dispensing control part 144 to press the push button 522 of the container 500 the calculated number of times to dispense the liquid object.

<Rotation Control of Liquid Object Dispenser 100>

The device control part 141 of the liquid object dispenser 100 controls the rotation motor 113 such that the turntable 110 is so rotated as to reduce the total distance of transferring the container accommodating parts 120 of the containers 500 that perform dispensing to the dispensing position PosA in the case of dispensing the stored liquids of the containers 500.

Figure 9:
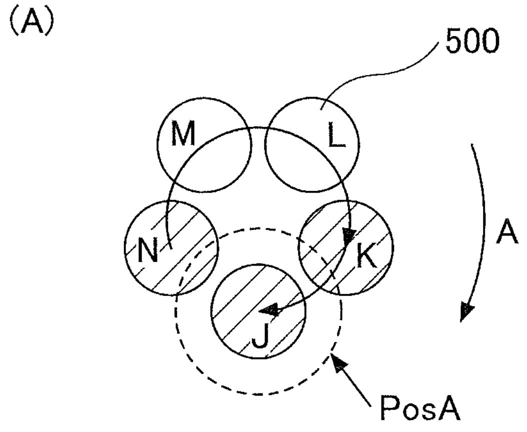
FIG. 9 is a diagram illustrating a series of operations of the liquid object dispenser according to this embodiment.
Figure 9:
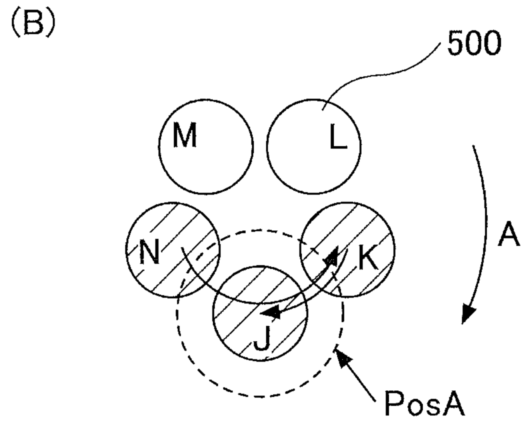

FIG. 9 illustrates diagrams illustrating the rotation control of the liquid object dispenser 100. FIG. 9 illustrates diagrams depicting the arrangement of the container 500 accommodated in the container accommodating parts 120.

According to the liquid object dispenser 100, the five containers 500 are accommodated in the container accommodating parts 120. It is assumed that the container 500 of J is at the dispensing position PosA in the initial state. Here, it is assumed that the liquid objects of the containers 500 with diagonal lines, specifically, the containers 500 of J, K and N, are dispensed.

FIG. 9(A) is a diagram of the case where the turntable 110 is rotated in the direction of arrow A such that the containers 500 of J, K and N are at the dispensing position PosA in order of the containers 500 of J, K and N. In the case of turning to the next container 500, the turntable 110 rotates 72 degrees (=360÷5). In the case of FIG. 9(A), the turntable 110 rotates 288 degrees (=72+72×3) in total.

FIG. 9(B) is a diagram of the case where the turntable 110 rotates in the direction of arrow A so that the container 500 at the dispensing position PosA switches from the container 500 of J to the container 500 of K, and rotates in a direction opposite to the direction of arrow A so that the container 500 at the dispensing position PosA switches from the container 500 of K to the container 500 of N. In the case of FIG. 9(B), the turntable 110 rotates 216 degrees (=72+72×2) in total.

According to the liquid object dispenser 100 of this embodiment, as illustrated in FIG. 9(B), the rotation motor 113 is controlled such that the turntable 110 is so rotated as to reduce the total angle of rotating, that is, the total distance of transferring, the container accommodating parts 120 of the containers 500 that perform dispensing to the dispensing position PosA.

Thus, by reducing the total angle of rotation of the turntable 110, it is possible to reduce time for rotating the containers 500. As a result, the wait time of the user before all liquid objects are dispensed can be reduced.

<Operation and Effects>

Thus, employment of the turntable 110 including the container accommodating parts 120 and the dispensing mechanism 130 by the liquid object dispenser 100 makes it possible to dispense liquid objects without increasing the dispensing mechanism 130 or the dispensing detector 160 even when the number of containers 500 increases.

Furthermore, because each container 500 dispenses a liquid object at the dispensing position PosA, the dispensed liquid objects of the containers 500 are dispensed onto the same place.

Furthermore, because the container 500 is replaced at the replacement position PosB, the container accommodating part 120 with respect to which the replacement is performed can be clearly identified to the user. Accordingly, it is possible to prevent wrong insertion of the container 500.

Furthermore, according to the liquid object dispenser 100 of this embodiment, the pipes 524 of the containers 500 accommodated in the container accommodating parts 120 are on the outer side relative to the rotary shaft 112 of the turntable 110. Therefore, the extraction opening 106 can be provided on the front side in the hand insertion part 105. Accordingly, a liquid object can be dispensed without the user inserting her/his hand to the bottom of the hand insertion part 105.

DESCRIPTION OF THE REFERENCE NUMERALS

100 liquid object dispenser
102 upper housing
103 lower housing
110 turntable
113 rotation motor

130 dispensing mechanism
143 rotation control part
PosA dispensing position
PosB replacement position

The invention claimed is:

1. A liquid object dispenser comprising:
a housing;
a plurality of containers;
a turntable including a plurality of container accommodating parts accommodating the containers, the turntable being able to relatively transfer the container accommodating parts to a replacement position in the housing at which the containers are replaced and to a dispensing position in the housing at which stored liquids of the containers accommodated in the container accommodating parts are dispensed; and
a liquid object dispensing part configured to cause the stored liquids of the containers accommodated in the container accommodating parts at the dispensing position to be dispensed,
wherein the containers include respective pipes, and
the pipes are on an outer side of the container accommodating parts relative to a rotary shaft of the turntable with the containers being accommodated in the container accommodating parts.

2. The liquid object dispenser as claimed in claim 1, further comprising:
a drive part configured to rotate the turntable; and
a control part,
wherein the control part is configured to
in a case of accommodating a predetermined container in a predetermined container accommodating part, so control the drive part as to transfer the predetermined container accommodating part to the replacement position, and
in a case of dispensing a stored liquid of the predetermined container accommodated in the predetermined container accommodating part, so control the drive part as to transfer the predetermined container accommodating part to the dispensing position, and
wherein the replacement position and the dispensing position are at different positions in a plan view.

3. The liquid object dispenser as claimed in claim 2, wherein the control part is configured to, in a case of dispensing the stored liquids of the containers, control the drive part such that the turntable is so rotated as to reduce a total distance of transferring the container accommodating parts of the containers to the dispensing position.

4. The liquid object dispenser as claimed in claim 1, wherein the pipes vertically extend relative to the turntable with the containers being accommodated in the container accommodating parts.

5. The liquid object dispenser as claimed in claim 1, wherein
the containers include
respective bodies configured to store the liquids, and
respective lids attached one to each of the bodies, and including respective push buttons,
the pipes are included one in each of the lids, and have respective dispensing openings at respective ends opposite to the push buttons,
the push buttons are configured to be pressed to dispense the stored liquids from the dispensing openings, and
the push buttons face away from the bodies with the containers being accommodated in the container accommodating parts.

6. The liquid object dispenser as claimed in claim 5, wherein the containers further include respective information recording parts provided one at a bottom surface of each of the bodies, the information recording parts recording information of the containers.

7. The liquid object dispenser as claimed in claim 6, wherein the information recording parts are RFID tags or barcodes.

8. The liquid object dispenser as claimed in claim 5, further comprising:
a motor configured to rotate the turntable; and
a hardware processor configured to control an operation of the liquid object dispenser,
wherein the housing includes
a first housing on which the turntable, the liquid object dispensing part, the motor, and the hardware processor are provided; and
a second housing on the first housing and covering the turntable, the liquid object dispensing part, the motor, and the hardware processor,
wherein the first housing includes
a hand insertion part; and
an extraction opening and a sensor above the hand insertion part, and
wherein the hardware processor is configured to, in response to the sensor detecting insertion of a human hand into the hand insertion part, cause the motor to rotate the turntable and cause the liquid object dispensing part to press the push button of one of the containers at the dispensing position toward the body to dispense the stored liquid from the pipe to the hand insertion part through the extraction opening, according to information received from an external apparatus.

* * * * *